United States Patent
Jha

(10) Patent No.: US 11,072,437 B2
(45) Date of Patent: Jul. 27, 2021

(54) AIRCRAFT BEACON LIGHT AND AIRCRAFT COMPRISING THE SAME

(71) Applicant: Goodrich Lighting Systems GmbH, Lippstadt (DE)

(72) Inventor: Anil Kumar Jha, Lippstadt (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 16/168,861

(22) Filed: Oct. 24, 2018

(65) Prior Publication Data

US 2019/0144131 A1 May 16, 2019

(30) Foreign Application Priority Data

Oct. 24, 2017 (EP) .................................... 17198068

(51) Int. Cl.
*B64D 47/06* (2006.01)
*F21V 7/00* (2006.01)
(Continued)

(52) U.S. Cl.
CPC ............ *B64D 47/06* (2013.01); *F21S 10/066* (2013.01); *F21V 7/0016* (2013.01); *F21V 13/04* (2013.01); *F21V 23/005* (2013.01); *B60Q 1/30* (2013.01); *B64D 2203/00* (2013.01); *F03D 80/10* (2016.05); *F21S 43/14* (2018.01); *F21V 5/046* (2013.01); *F21V 7/06* (2013.01); *F21Y 2103/33* (2016.08); *F21Y 2115/10* (2016.08)

(58) Field of Classification Search
CPC ....... B64D 47/06; F21V 7/0016; F21V 7/041; F21V 23/005
See application file for complete search history.

(56) References Cited

U.S. PATENT DOCUMENTS 5,335,157 A * 8/1994 Lyons ................. B60Q 1/2611
362/297
6,464,373 B1 * 10/2002 Petrick ................... F21V 11/14
257/E25.028

(Continued)

FOREIGN PATENT DOCUMENTS

CN 103868022 A 6/2014
DE 102012211935 A1 1/2014
(Continued)

OTHER PUBLICATIONS

Extended European Search Report for International Application No. 17198068.3 dated Dec. 15, 2017, n 10 pages.

*Primary Examiner* — Rajarshi Chakraborty
*Assistant Examiner* — Nathaniel J Lee
(74) *Attorney, Agent, or Firm* — Cantor Colburn LLP

(57) ABSTRACT

An aircraft beacon light is provided for emitting flashes of red light into an environment around an aircraft. The aircraft beacon light includes a support plate having a central portion; a plurality of LEDs, arranged on the support plate around the central portion and facing away from the support plate; an annular light splitting element, having a proximate side arranged over and facing the plurality of LEDs, wherein the proximate side has reflective portions and transmissive portions; and at least one light conditioning element for redirecting light having passed through the transmissive portions of the proximate side of the annular light splitting element.

13 Claims, 8 Drawing Sheets

(51) Int. Cl.
  *F21V 13/04* (2006.01)
  *F21S 10/06* (2006.01)
  *F21V 23/00* (2015.01)
  *F21Y 115/10* (2016.01)
  *F21V 5/04* (2006.01)
  *F03D 80/10* (2016.01)
  *B60Q 1/30* (2006.01)
  *F21S 43/14* (2018.01)
  *F21Y 103/33* (2016.01)
  *F21V 7/06* (2006.01)

(56) References Cited

U.S. PATENT DOCUMENTS

| | | |
|---|---|---|
| 8,454,212 B2 * | 6/2013 | Fabbri .................... B64D 47/06 |
| | | 362/470 |
| 9,279,562 B2 | 3/2016 | Lapujade |
| 9,731,841 B2 | 8/2017 | Jha |
| 2006/0007012 A1 | 1/2006 | Machi et al. |
| 2010/0027281 A1 | 2/2010 | Waters et al. |
| 2013/0128570 A1 | 5/2013 | Jiang |
| 2016/0332746 A1 | 11/2016 | Williams |
| 2017/0137148 A1 | 5/2017 | Jha et al. |
| 2017/0267375 A1 * | 9/2017 | Franich .................... F21V 7/048 |

FOREIGN PATENT DOCUMENTS

| | | | | |
|---|---|---|---|---|
| DE | 102012211936 A1 * | 1/2014 | ............. | F21K 9/232 |
| EP | 3219623 A1 | 9/2017 | | |

\* cited by examiner

AIRCRAFT BEACON LIGHT AND AIRCRAFT COMPRISING THE SAME

FOREIGN PRIORITY

This application claims priority to European Patent Application No. 17198068.3 filed Oct. 24, 2017, the entire contents of which is incorporate herein by reference.

TECHNICAL FIELD

The present invention is in the field of exterior aircraft lighting. In particular, the present invention is in the field of aircraft beacon lights, in operation emitting flashes of red light into the aircraft environment.

BACKGROUND

Almost all aircraft are equipped with a plurality of exterior lights. The exterior lighting of aircraft has a number of functions, such as providing active visibility to the pilots and/or crew, providing passive visibility for others to see the aircraft, as well as special functions, such as cargo loading lights, logo illumination lights, etc. For passive visibility purposes, most aircraft have red, green and white navigation lights, also referred to as position lights, in order to indicate the side and tail portions of the aircraft to the environment, as well as anti-collision lights. With respect to the latter, most aircraft have white strobe anti-collision lights as well as red beacon lights. Both of these lights are configured in a way that they emit light flashes into the aircraft environment. In particular, from any given viewing direction on an airfield towards the aircraft, an observer may perceive white light flashes from the white strobe anti-collision lights and red light flashes from the beacon lights. The red-flashing beacon lights are generally used to indicate that the engines of the aircraft are running, which is particularly important information for the ground personnel working on the airfield.

Most airplanes have two beacon lights, one arranged on top of the airplane fuselage and one arranged on the bottom of the airplane fuselage. In order for the light flashes to be seen around the airplane, the beacon lights extend upwards/downwards from the airplane fuselage, respectively. Due to their positioning, the beacon lights introduce aerodynamic drag and are prone to mechanical problems, such as bird strike. Also, with their positions being fairly remote from the airplane core, provision of power to the beacon lights can be an issue.

Accordingly, it would be beneficial to provide an aircraft beacon light with high efficiency and to provide an aircraft comprising or more of such beacon lights.

SUMMARY

Exemplary embodiments of the invention include an aircraft beacon light for emitting flashes of red light into an environment around an aircraft, the aircraft beacon light comprising a support plate having a central portion; a plurality of LEDs, arranged on the support plate around the central portion and facing away from the support plate; an annular light splitting element, having a proximate side arranged over and facing the plurality of LEDs, wherein the proximate side has reflective portions and transmissive portions; and at least one light conditioning element for redirecting light having passed through the transmissive portions of the proximate side of the annular light splitting element.

Exemplary embodiments of the invention allow for a particularly good usage of available light and, thus, for the satisfaction of given design/regulatory requirements with comparably low power. In particular, by splitting the light from the plurality of LEDs via the annular light splitting element, additional degrees of freedom may be gained, because different portions of the light from the plurality of LEDs may be used for satisfying different requirements of the aircraft beacon light. The reflective portions of the proximate side of the annular light splitting element, on the one hand, and the at least one light conditioning element, on the other hand, may be particularly adapted to satisfying the light output requirements of the beacon light, such that a particularly large portion of the light from the plurality of LEDs can be brought to targeted use for satisfying the requirements. For example, as compared to previous approaches where the reflector over the plurality of LEDs was deliberately sized to effect only a comparably small portion of the light, in order have sufficient light in various directions of comparably low intensity, the reflective portions of the annular light splitting element may be sized to affect a larger portion of light from the plurality of LEDs and collimate more light in light output directions of high light intensity, because the transmissive portions of the annular light splitting element may divert sufficient light for the required light output in directions of lower light intensity. In other words, the transmissive portions of the annular light splitting element may eliminate the need for an inefficient use of light from the plurality of LEDs for output directions with a comparably low intensity. The annular light splitting element, the reflective portions, and the at least one light conditioning element jointly provide for degrees of freedom that allow for an efficient use of the light output of the plurality of LEDs, while allowing to keep the space required for the aircraft beacon light small.

The aircraft beacon light is configured for emitting flashes of red light into the surroundings of the aircraft. The red light may in particular be aviation red light. A red light output may be achieved by the plurality of LEDs being a plurality of red color LEDs. It is also possible that the plurality of LEDs are white LEDs or another suitable color LEDs, having a red spectral component, and that a red light filter is provided in the aircraft beacon light. For example, the aircraft beacon light may have a lens cover, and said lens cover may be of a red transparent material, i.e. it may form a red filter.

The aircraft beacon light may have a control unit that controls the plurality of LEDs in a way that said flashes of red light are emitted. In particular, the control unit may be configured to switch the plurality of LEDs on and off in a synchronized manner. In this way, the red light flashes may be seen all around the aircraft at the same time. It is also possible that the control unit is configured to switch the plurality of LEDs on/off in subsequent order, such as in subsequent order along the arrangement around the central portion of the support plate. In this way, a revolving flashing effect may be achieved. When switching the plurality of LEDs on/off in such subsequent order, a time overlap between adjacent LEDs is possible.

The plurality of LEDs are arranged around the central portion of the support plate. In other words, there is provided a region of the support plate that is free of LEDs and that is surrounded by the plurality of LEDs. The plurality of LEDs are arranged around said region free of LEDs, with the region free of LEDs being referred to as the central portion of the support plate. In particular, the plurality of LEDs may be arranged along a regular geometric contour around the central portion of the support plate, such as along a circular contour or an elliptical contour. However, it is also possible that the plurality of LEDs are arranged in a non-regular manner around the central portion. The plurality of LEDs may be arranged right next to each other around the central portion or may be spaced apart from each other around the central portion.

The annular light splitting element is arranged over the plurality of LEDs and has its proximate side facing the plurality of LEDs. The term annular does not require the light splitting element to be circular. Rather, in analogy to the arrangement of the plurality of LEDs around the central portion of the support plate, the annular light splitting element may have any kind of ring shape, regular or irregular, that provides a continuous structure over the plurality of LEDs. In other words, the term annular says that the light splitting element is an extended structure over the arrangement of the plurality of LEDs, and that the proximate side thereof runs over the entire arrangement of the plurality of LEDs.

The terms reflective portions and transmissive portions do not require the reflective part of the proximate side and the transmissive part of the proximate side to be discontinuous structures. In other words, the use of the plural form of the terms reflective portions and transmissive portions does not require separate, spaced reflective and transmissive portions, respectively. Rather, the terms reflective portions and transmissive portions indicate that different reflective and transmissive parts of the proximate side are seen by different LEDs, in particular by LEDs on different sides of the closed contour. It is possible that one or both of the reflective portions and the transmissive portions form(s) a continuous reflective/transmissive area.

The term light conditioning element refers to any kind of optical structure that is able to alter the direction of light rays. In particular, a light conditioning element may be a reflective light conditioning element, a refractive light conditioning element, or a diffractive light conditioning element.

According to a further embodiment, the plurality of LEDs are arranged on the support plate in a substantially circular arrangement. In particular, the plurality of LEDs may be arranged in an equidistant manner along a substantially circular contour. In this way, a substantially uniform light output across 360° may be achieved by the aircraft beacon light. Said substantially uniform light output may in particular be achieved by arranging the plurality of LEDs in a substantially circular arrangement and by providing a rotationally symmetric annular light splitting element and one or more rotationally symmetric light conditioning elements, as described below.

According to a further embodiment, the reflective portions of the proximate side of the annular light splitting element are shaped to reflect light from the plurality of LEDs towards light output directions parallel to the support plate. In other words, reflective portions of the proximate side of the annular light splitting elements are shaped to modify the highly divergent light output of the plurality of LEDs, which may have an opening angle of up to 180° in a cross-sectional view, into a light output with a much more narrow opening angle in a cross-sectional view. In particular, the reflective portions may reflect all light rays, leaving the plurality of LEDs, into directions that have a smaller angle with respect to the support plate than the original light rays. In this context, it is pointed out that an angle of 0° with respect to the support plate is defined as an angle of a light ray travelling laterally outwards form the aircraft beacon light in the plane of the support plate or in a plane parallel to the support plate. In this way, the reflective portions of the proximate side of the annular light splitting element have a collimating effect on the light from the plurality of LEDs. This in turn allows for satisfying high light intensity requirements in light output directions having an angle of 0° or having small angles with respect to the support plate.

According to a further embodiment, the proximate side of the annular light splitting element has, in cross-section, a first substantially parabolic light collimation section. The term cross-section refers to a cross-section through the aircraft beacon light orthogonal to the support plate. Accordingly, in operation, the cross-section in question is a vertical cross-section through the aircraft beacon light. Further, the term in cross-section means that the substantially parabolic light collimation section is present in at least one cross-section through the aircraft beacon light, orthogonal to the support plate. The first substantially parabolic light collimation section may, however, be present in various cross-sections through the aircraft beacon light and may, in particular, be present in all cross-sections through the aircraft beacon light, orthogonal to the support plate. The plurality of LEDs may be arranged in respective focal points of the substantially parabolic light collimation sections in the respective cross-sections. Such substantially parabolical light collimation allows for a very effective alignment of the light output of the plurality of LEDs in a particular output plane.

According to a further embodiment, the light reflected from the first substantially parabolic light collimation section is collimated substantially parallel to the support plate. In particular, the individual light rays may leave the aircraft beacon light in parallel with the support plate and at heights above the support plate. This provision of light rays in different heights above the support plate, and thus in different planes above the support plate, is a near field phenomenon. In the far field, i.e. when the aircraft beacon light is observed from a distance large enough to be perceived as a point light source, these light rays are perceived as being in the same output plane. In this way, a very high light intensity at an angle of 0° with respect to the support plate may be achieved in an effective manner.

According to a further embodiment, the proximate side of the annular light splitting element has, in cross-section, a second substantially parabolic light collimation section, with light reflected from the second substantially parabolic light collimation section in particular having an angle of between 5° and 15°, further in particular of between 5° and 10°, with respect to the support plate. By providing a second substantially parabolic light collimation section, a second angular region of comparably high light intensity may be achieved in an effective manner in addition to the high light intensity in directions having an angle of 0° with respect to the support plate. In this way, the high light intensity requirements for aircraft beacon lights in angular regions close to the light output directions of 0° with respect to the support plate can be effectively achieved. In the context of the second substantially parabolic light collimation section, the term in cross-section is used in a manner analogous to above use with respect to the first substantially parabolic light collimation section.

According to a further embodiment, the second substantially parabolic light collimation section is provided to a lateral inside of the first substantially parabolic light collimation section, i.e. towards the central portion of the support plate, when seen from the first substantially parabolic light collimation section.

According to a further embodiment, the annular light splitting element is mounted to the support plate. In particular, the annular light splitting element may be mounted to the central portion of the support plate, around which the plurality of LEDs are arranged. In that case, the plurality of LEDs are arranged around the mounting portion of the annular light splitting element.

According to a further embodiment, the at least one light conditioning element comprises a refractive surface, and the refractive surface forms part of a distal side of the annular light splitting element. In this way, the conditioning of the light, passing through the transmissive portions of the proximate side of the annular light splitting element, may be integrated into the structure of the annular light splitting element, thus allowing for a particularly compact arrangement of the reflective portions and the light conditioning element. A particularly flat embodiment of an aircraft beacon light may be achieved.

According to a further embodiment, the at least one light conditioning element comprises an additional reflector. The additional reflector is an effective means of shaping the light output for that part of the light from the LEDs that has passed through the transmissive portions of the annular light splitting element. The reflector also allows for a high degree of design freedom with respect to its shape and, thus, with respect to the resulting light output.

According to a further embodiment, the additional reflector has, in cross-section, a third substantially parabolic light collimation section. In this way, an additional angular range of high light intensity or additional light intensity in one of the angular ranges discussed above may be achieved via the additional reflector. In particular, the additional reflector may also collimate light in light output directions parallel to the support plate. It is pointed out, however, that the additional reflector may also have any other kind of shape, in particular any other kind of free form shape, in order to achieve a desired light output for the particular beacon light in question. In particular, the additional reflector may be adapted to the particular shape of the proximate side of the annular light splitting element and to the ratio between transmissive portions and reflective portions on the proximate side of the annular light splitting element.

According to a further embodiment, the aircraft beacon light further comprises a support arm, extending from the support plate, wherein the additional reflector is part of the support arm or is attached to the support arm. In particular, the support arm may extend from the support plate in an orthogonal manner. In this way, the additional reflector may be arranged at a stable and well-defined distance with respect to the support plate. In particular, the support arm may be extend from the central portion of the support plate. It may further be attached to the central portion of the support plate. The elevated arrangement of the additional reflector may allow for passing the light, after being reflected by the additional reflector, by obstacles that are present in the near field of the aircraft beacon light. For example, in case light from the plurality of LEDs, which is reflected by the reflective portions of the annular light splitting element, is blocked in a particular output direction by some obstacle arranged on the aircraft fuselage, the light reflected by the additional reflector may fill that gap in the light output of the aircraft beacon light, thus ensuring sufficient illumination in output directions that are otherwise problematic.

According to a further embodiment, at least part of the transmissive portions of the proximate side of the annular light splitting element are arranged over the central portion of the support plate, and the additional reflector is arranged to reflect light having passed through the transmissive portions over the central portion of the support plate. In this way, the additional reflector can be kept limited in extension around the center of the aircraft beacon light, thus helping in providing an overall small space envelope for the aircraft beacon light. The region over the central portion of the support plate is also referred to as a lateral inside of the support plate with respect to the plurality of LEDs. The region over the central portion of the support plate is defined with respect to light emission directions of the plurality of LEDs that are orthogonal to the support plate. In particular, the region over the central portion of the support plate refers to those light emission directions that are towards the inside of the arrangement of the plurality of LEDs and not towards the lateral outside thereof.

According to a further embodiment, the at least one light conditioning element comprises an additional lens. Said additional lens may be arranged over the light splitting element and may affect all or a portion of the light having passed through the transmissive portions of the proximate side of the annular light splitting element.

It is pointed out that all different light conditioning elements discussed above, namely the refractive surface, the additional reflector, and the additional lens, or a subset thereof may be present in the aircraft beacon light.

According to a further embodiment the reflective portions of the proximate side of the annular light splitting element are metallized portions of the annular light splitting element and the transmissive portions of the proximate side of the annular light splitting element are non-metallized portions of the annular light splitting element. In particular, the annular light splitting element may have a transmissive body. The distinction between reflective portions and transmissive portions may be realised via a metallic coating applied to said transmissive body. In other words, the reflective portions of the proximate side of the annular light splitting element may be portions to which a metallic coating is applied. Analogously, the transmissive portions of the proximate side of the annular light splitting element may be portions to which no metallic coating is applied. Applying a metallic coating is an effective way of providing reflective portions, and the application of such metallic coating can be performed with great accuracy. In this way, the split between reflective and transmissive portions can be achieved with high accuracy, allowing for a very exact and accurate splitting of light.

According to a further embodiment, the transmissive portions of the proximate side of the annular light splitting element are transmissive dots. In particular, the transmissive portions of the proximate side of the annular light splitting element may be non-metallized dots. The provision of dots as transmissive portions allows for providing a well-defined pattern of transmissive portions, wherein the arrangement and size of the dots can be designed with a large degree of freedom, leading to a well-defined splitting of light between reflection and transmission. Also, a pattern of dots can be manufactured well in a repetitive manner.

According to a further embodiment, the annular light splitting element has a circumferential end that extends laterally outwards beyond the plurality of LEDs, and a light output direction from the plurality of LEDs to the circumferential end of the annular light splitting element has an angle of between 20° and 50° with respect to the support plate. In particular, the light output direction from the plurality of LEDs to the circumferential end of the annular light splitting element has an angle of between 30° and 40° with respect to the support plate. In other words, an imaginary connection line between the plurality of LEDs and the respectively closest portion of the circumferential end of the annular light splitting element has an angle of between 20° and 50°, in particular of between 30° and 40°, with respect to the support plate. In this way, the light splitting of the annular light splitting element and, in particular, the reflection and collimation of light by the angular light splitting element may be performed over a large angular range. For example, as compared to previous approaches where the angle in question was about 75°, a lot more light can be conditioned in a desired manner. This is made possible, because light intensity requirements at larger angles with the support plate may be fulfilled with the light diverted through the transmissive portions, whereas previous approaches relied on light passing by the reflector for satisfying these requirements.

According to a further embodiment the reflective portions cover between 50% and 95%, in particular between 60% and 90%, of the proximate side of the angular light splitting element.

According to a further embodiment, the annular light splitting element is rotationally symmetric. Further, one or more or all of the at least one light conditioning element may also be rotationally symmetric. In this way, a substantially uniform light intensity distribution across 360° around the aircraft beacon light may be achieved.

According to a further embodiment, the aircraft beacon light is in compliance with Federal Aviation Regulations (FAR) section 25.1401. In particular, the aircraft beacon light may satisfy the minimum light intensities, as given in FAR section 25.1401 (f). Further in particular, said minimum light intensities may be satisfied for the angles above the horizontal plane or the angles below the horizontal plane, depending on where the aircraft beacon light is mounted.

Exemplary embodiments of the invention further include an aircraft comprising at least one aircraft beacon light, as described in any of the embodiments above. The aircraft may in particular be an airplane. Further in particular, the aircraft may comprise an upper aircraft beacon light, as described in any of the embodiments above, mounted to an upper portion of a fuselage of the aircraft, and/or a lower aircraft beacon light, as described in any of the embodiments above, mounted to a lower portion of a fuselage of the aircraft. The additional features, modifications, and effects, as described above with respect to the aircraft beacon light, apply to the aircraft in an analagous manner.

BRIEF DESCRIPTION OF THE DRAWINGS

Further exemplary embodiments of the invention are described below with reference to the accompanying drawings, wherein.

DETAILED DESCRIPTION

Figure 1:
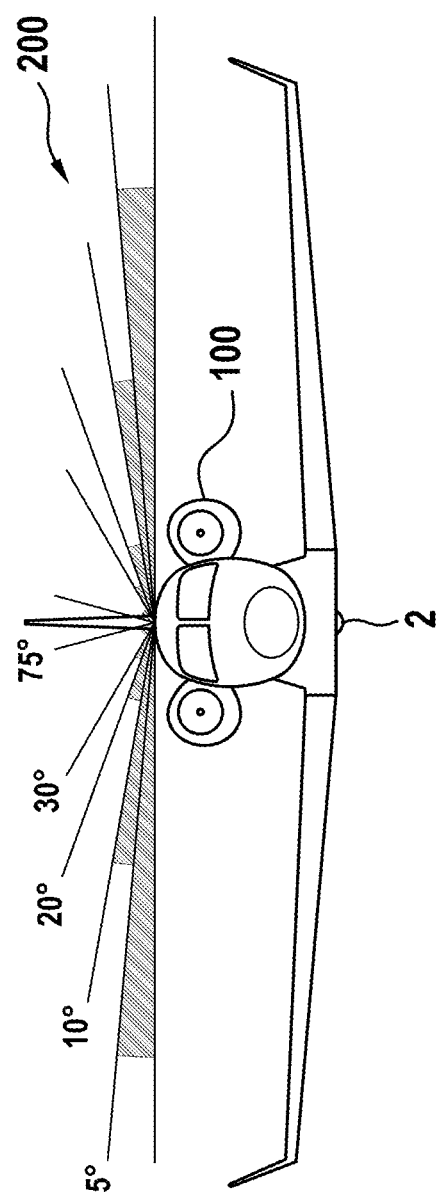
FIG. 1 shows an aircraft in accordance with an exemplary embodiment of the invention and illustrates the light intensity requirements for aircraft beacon light, as given by the Federal Aviation Regulations.

FIG. 1 shows an aircraft 100 in accordance with an exemplary embodiment of the invention. The aircraft 100 has a lower beacon light 2 in accordance with an exemplary embodiment of the invention, mounted to a lower portion of the fuselage of the aircraft 100. The aircraft 100 also has an upper beacon light in accordance with an exemplary embodiment of the invention, mounted to an upper portion of the fuselage of the aircraft 100. The upper beacon light is not depicted in FIG. 1, because the upper part of the aircraft 100 is used to illustrate a required light intensity distribution 200, as required by the Federal Aviation Regulations. The upper beacon light, which is not shown, and the lower beacon light 2 satisfy the required light intensity distribution 200, i.e. their light output is above the given required intensity levels for all angles.

The required light intensity distribution 200 is in accordance with the Federal Aviation Regulations (FAR) requirements for a beacon light. In particular, the required light intensity distribution 200 reflects the requirements of FAR section 25.1401. The required light intensity distribution 200 is shown as an angular distribution with respect to a horizontal plane. In particular, the required light intensity distribution 200 is shown in a vertical cross-sectional plane that is orthogonal to the longitudinal extension of the aircraft fuselage. However, as the FAR requirements are described as a rotationally symmetric distribution, i.e. as a distribution that is identical in all viewing directions from the beacon light, the shown light intensity distribution would look the same in all vertical cross-sections through the center of the beacon light.

The required light intensity distribution 200 is as follows. A light intensity of 400 cd is required for an angular range of between 0° and 5° with respect to the horizontal plane. A light intensity of 240 cd is required in an angular range of between 5° and 10° with respect to the horizontal plane. A light intensity of 80 cd is required in an angular range between 10° and 20° with respect to the horizontal plane. A light intensity of 40 cd is required in an angular range of between 20° and 30° with respect to the horizontal plane. A light intensity of 20 cd is required in an angular range of between 30° and 75° with respect to the horizontal plane. Accordingly, the required light intensity values, shown as angular sectors in FIG. 1, represent minimum light intensity values, required by the FAR. As the horizontal plane is the plane with the highest required light intensity, it can also be referred to as main light output plane.

Figure 2:
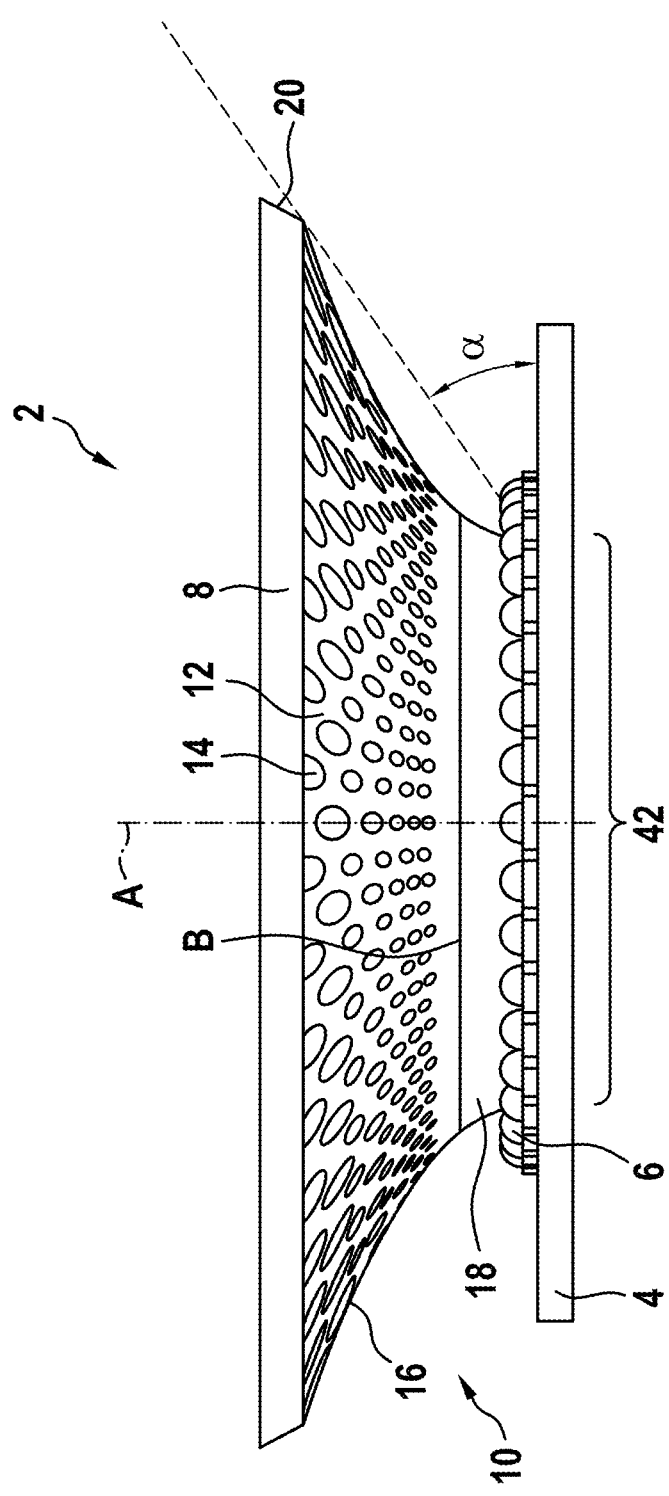
FIG. 2 shows an aircraft beacon light in accordance with an exemplary embodiment of the invention in a side view.

FIG. 2 shows an aircraft beacon light 2 in accordance with an exemplary embodiment of the invention in a side view. The aircraft beacon light 2 has a support plate 4, which is a printed circuit board (PCB) in the exemplary embodiment of FIG. 2. The support plate 4 has a central portion 42. A plurality of LEDs 6 are arranged on the support plate 4. In particular, the plurality of LEDs 6 are arranged around the central portion 42 of the support plate 4. Further in particular, the plurality of LEDs 6 are arranged in a circular arrangement around the central portion 42. In the exemplary embodiment of FIG. 2, 36 LEDs are arranged on the support plate 4. The LEDs 6 are arranged along a circular contour in the exemplary embodiment of FIG. 2, which is also illustrated well in FIG. 4.

The aircraft beacon light 2 further has an annular light splitting element 8. The annular light splitting element 8 is attached to the central portion 42 of the support plate 4. In this way, the annular light splitting element 8 is attached to the support portion 4 on an inside of the circular contour of the LEDs 6. The annular light splitting element 8 is attached to the support plate 4 with an annular support plate mounting portion, whose diameter is smaller than the diameter of the circular contour of the LEDs 6.

The annular light splitting element 8 is a hollow structure in the sense that, in the absence of the support plate 4, an opening through the annular light splitting element 8 exists. It is pointed, however, that the annular light splitting element 8 would still be considered an annular light splitting element, even if it were a solid structure. This is because the optical effect of the annular light splitting element 8 is present for the light, as emitted by the LEDs 6, in a ring-shaped, i.e. in an annular manner. In other words, the term annular light splitting element refers to its nature as providing an optical effect all around the closed contour of the LEDs 6 and does not require a hollow structure. A hollow embodiment, however, may be beneficial in terms of space-efficiency and weight. The annular light splitting element 8 is made from a light transmissive material, e.g. from a light transmissive plastics material, with some areas thereof being metallized, as will be explained below.

The annular light splitting element 8 has a proximate side 10 that is arranged towards the support plate 4 and that faces the plurality of LEDs 6. As seen from the support plate 4, the LEDs 6 face away from the support plate 4 and face the annular light splitting element 8, in particular the proximate side 10 thereof. In this way, much of the light emitted by the LEDs 6 is incident on the proximate side 10 of the annular light splitting element 8, as will be described in more detail below.

The proximate side 10 has reflective portions 12 and transmissive portions 14. In particular, the proximate side 10 has metallized portions, which form the reflective portions 12, and non-metallized portions, which form the transmissive portions 14. The non-metallized portions are transmissive due to the inherently transmissive properties of the body of the annular light splitting element 8. In particular, in the exemplary embodiment of FIG. 2, the proximate side 10 has a regular pattern of non-metallized dots, which form a regular pattern of transmissive portions 14 around the proximate side 10 of the annular light splitting element 8. The metallized portions surround the non-metallized dots and form a continuous area around the non-metallized dots along the entire circumference of the proximate side 10.

The term reflective portions is used in plural to denote that different reflective parts of the proximate side 10 may be illuminated by different LEDs 6, e.g. when looking at LEDs 6 on opposite sides of the annular light splitting element 8. These reflective portions may still form a continuous area around the annular light splitting element 8. The same may be true for the transmissive portions, depending on the particular embodiment thereof. Also, the transmissive portions may cover a continuous area, while the area of the reflective portions may be split up between various discrete patches.

The proximate side 10 of the annular light splitting element 8 has a first parabolic light collimation section 16 and a second parabolic light collimation section 18. The second parabolic light collimation section 18 is proximate to the support plate 4, and the first parabolic light collimation section 16 is distal from the support plate 4. The second parabolic light collimation section 18 extends over about ⅓ of the extension of the proximate side 10, when looking at the vertical extension of the light splitting element 8 in the viewing direction of FIG. 2. The first parabolic light collimation section extends along about ⅔ of said vertical extension. The transmissive portions 14 are only present in the first parabolic light collimation section 16 in the exemplary embodiment of FIG. 2. The term light collimation section refers to the contour of the proximate side 10 in cross-section, as will be explained in more detail with respect to FIG. 5, and does not have any implications with respect to the presence or non-presence of transmissive portions. The dividing line between the first parabolic light collimation section 16 and the second parabolic light collimation section 18 is indicated with letter B in FIG. 2.

The aircraft beacon light 2, as shown in FIG. 2, is rotationally symmetric around axis of rotation A. In particular, the circular contour of the LEDs 6 is centered around the axis of rotation A. Further, the annular light splitting element 8 is rotationally symmetric around the axis of rotation A.

The proximate side 10 of the annular light splitting element 8 extends further outwards from the axis of rotation A than the circular arrangement of the LEDs 6. In particular, the annular light splitting element 8 has a circumferential end 20 that extends further outwards from the axis of rotation A than the circular arrangement of the LEDs 6. When seen from the LEDs 6, the angle α between the circumferential end 20 of the annular light splitting element 8 and the support plate 4 is about 40°. In this way, all light from the LEDs 6, except for the light emitted within this 40° angle α, is captured and conditioned by the light splitting element 8.

When mounted to an upper portion or a lower portion of an aircraft fuselage, the aircraft beacon light 2 is provided with a lens cover, extending over and enclosing at least the LEDs 6 and the light splitting element 8. The lens cover may be attached to the support plate 4 or may enclose the support plate 4 as well. In operation, the lens cover protects the LEDs 6 and the light splitting element 8 from the harsh environment of the aircraft.

In order to emit red light flashes, the LEDs 6 are red LEDs in the exemplary embodiment of FIG. 2. It is for example also possible that the LEDs 6 are white LEDs and that red spectral components are passed to the outside, e.g. via a red filter. For example, above described lens cover may be a red filter. The aircraft beacon light 2 further has a control unit, which controls the LEDs 6 and which operates the LEDs 6 to emit light flashes, in particular light flashes in accordance with the Federal Aviation Regulations.

Figure 3:
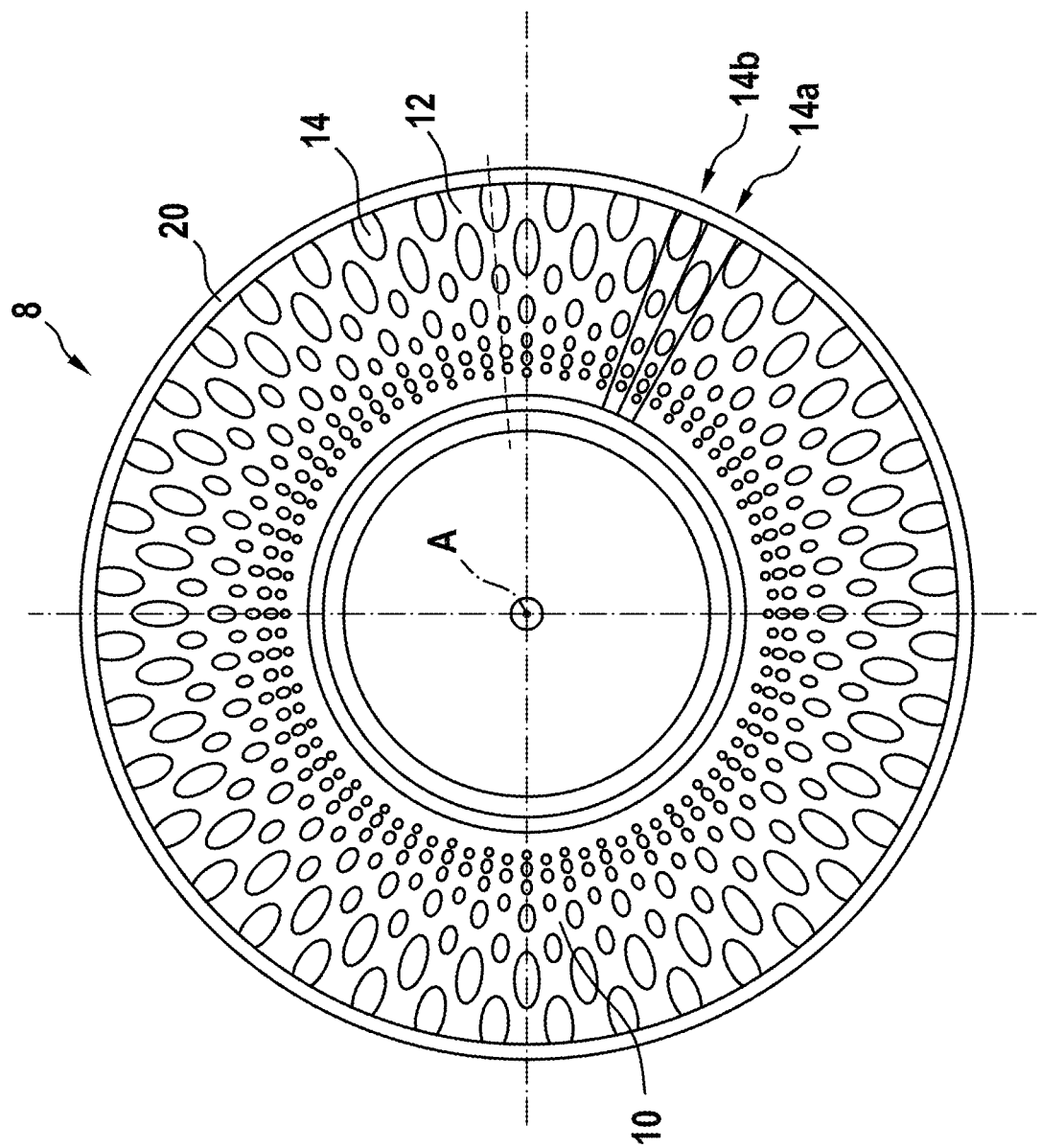
FIG. 3 shows the annular light splitting element of the aircraft beacon light of FIG. 2 in a plan view.

FIG. 3 shows the annular light splitting element 8 of the aircraft beacon light 2 of FIG. 2 in a plan view. In particular, FIG. 3 shows the proximate side 10 of the annular light splitting element 8. Accordingly, when making reference to the viewing direction of FIG. 2, the annular light splitting element 8 is shown from the bottom in FIG. 3.

As can be seen in FIG. 3, the proximate side 10 has a rotationally symmetric pattern of reflective portions 12 and transmissive portions 14. In particular, the transmissive portions 14 are arranged in a pattern of alternating radial rows of transmissive dots. In particular, radial rows 14a and 14b alternate around the circumference of the proximate side 10. In the first radial row 14a, five transmissive dots are present. The five transmissive dots have angles of 9°, 18°, 27°, 36°, and 45° with respect to the main light emission directions of the LEDs 6, i.e. with respect to the direction orthogonal to the support plate 4 at the position of the LEDs 6. Basis for these angular measurements is the center of the respective LED 6 and the center of the respective transmissive dot. In the second radial row 14b, the transmissive dots have angles of 13.5°, 22.5°, 31.5°, 40.5°, 49.5° with respect to the main light emission direction of the LEDs 6. Each of the first and second radial rows 14a, 14b is present 40 times around the circumference of the proximate side 10. The radial rows 14a, 14b are uniformly spaced around the circumference of the proximate side 10, i.e. they have the same angular distance with respect to the respectively adjacent radial rows across the entire circumference of the proximate side 10, as seen from the axis of rotation A. The transmissive dots become greater, the farther they are removed from the axis of rotation A, i.e. the farther they are removed from the LEDs 6. It is pointed out that the depicted arrangement of transmissive portions 14 and reflective portions 12 is exemplary only and may be adapted to the needs of a particular implementation. The important aspect is that, due to the presence of transmissive portions and reflective portions, the light from the LEDs 6 can be effectively split between light being conditioned on the proximate side of the annular light splitting element 8 and light being conditioned by other optical elements beyond the proximate side of the annular light splitting element 8.

Figure 4:
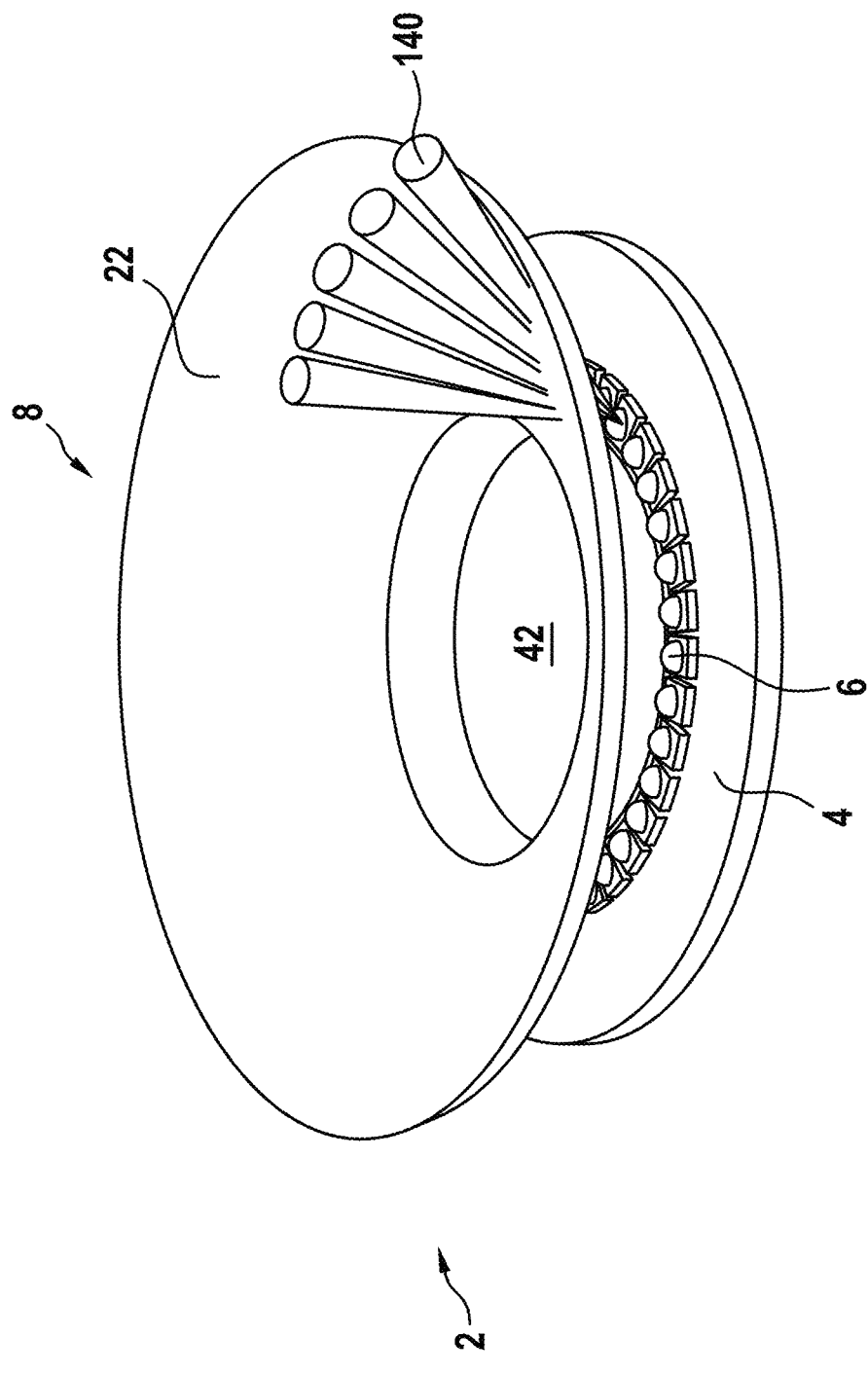
FIG. 4 shows the aircraft beacon light of FIG. 2 in a perspective top view.

FIG. 4 shows the aircraft beacon light 2 of FIG. 2 in a top perspective view. It can be seen well in FIG. 4 that the LEDs 6 are arranged in a circular arrangement on the support plate 4. It can further be seen well in FIG. 4 that all of the support plate 4, the arrangement of the LEDs 6, and the annular light splitting element 8 are rotationally symmetric structures. The central portion 42 of the support plate 4 is visible through the annular light splitting element 8.

With FIG. 4 being a top perspective view of the aircraft beacon light 2, a distal side 22 of the annular light splitting element 8 is visible in FIG. 4. The distal side 22 is also referred to as refractive surface 22, because it has a refractive effect on the light having passed through the transmissive portions 14 of the proximate side 10 of the annular light splitting element 8. The refractive effect of the refractive surface 22 will be explained in detail below with respect to FIG. 5.

For illustrative purposes, five light cones 140 are depicted in FIG. 4. The light cones 140 illustrate the light having passed through one radial row of transmissive portions 14, as shown in FIG. 3. The light cones 140 all have roughly the same solid angle of about 0.01 steradian. This same solid angle of the light cones 140 is the result of an increased size of the transmissive dots for an increased distance with respect to the respective LEDs 6. In the far field, the light of the light cones 140 blends into a continuous light output, thus forming a good basis for satisfying light intensity requirements at comparably large angles with respect to the support plate 4.

Figure 5:
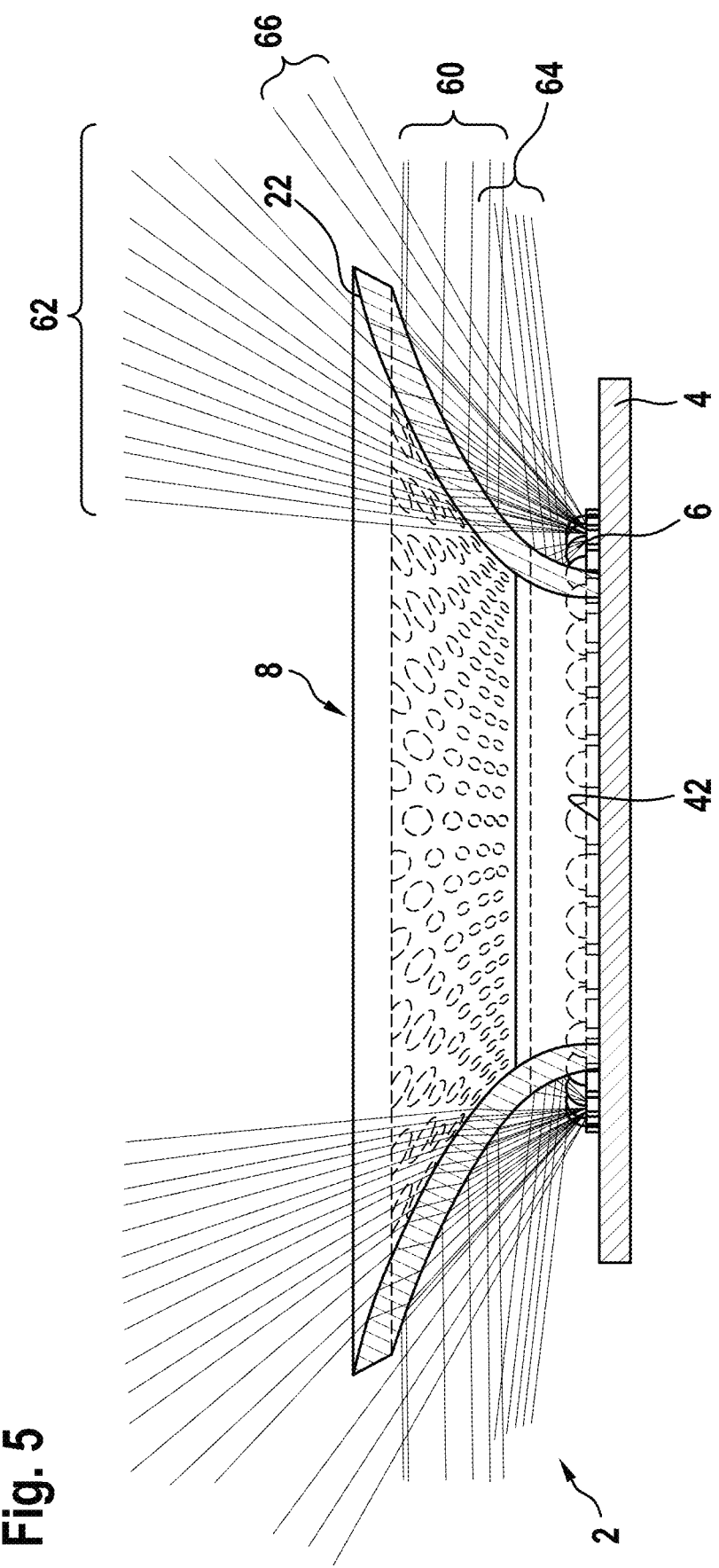
FIG. 5 shows a cross-sectional view through the aircraft beacon light of FIG. 2 and illustrates the light output via exemplary light rays.

FIG. 5 shows the aircraft beacon light 2 of FIG. 2 in a vertical cross-sectional view, i.e. in a cross-sectional view orthoganal to the support plate 4. The view of FIG. 5 is very similar to the view of FIG. 2, and full reference is made to above description of FIG. 2. As FIG. 5 shows various light rays for illustrating the operation of the light splitting element 8 and as said light rays are meant to be seen in a maximally unobstructed way, various reference numerals of FIG. 2 have been omitted in FIG. 5. Accordingly, for a complete picture of FIG. 5, the reference numerals of FIG. 2 are considered to be also present in FIG. 5.

For illustrative purposes, various exemplary light rays of the LED 6 that is arranged in the cross-sectional plane of FIG. 5 are depicted. A first portion 60 of light rays leaves the LED 6, reaches the first parabolic collimating section 16 at reflective portions 12, and is collimated in light output directions parallel to the support plate 4. A second portion of light rays 62 leaves the LED 6, reaches the first parabolic light collimation section 16 at transmissive portions 14, enters into the body of the annular light splitting element 8 at the proximate side 10, leaves the body of the annular light splitting element 8 at a distal side 22 thereof, also referred to as refractive surface 22, and leaves the aircraft beacon light 2 therefrom. A third portion of light rays 64 leaves the LED 6, reaches the annular light splitting element 8 at the second parabolic light collimation section 18, and is collimated in an angular region of between 5° and 10° with respect to the support plate 4. A fourth portion of light rays 66 leaves the LED 6, passes by the annular light splitting element 8, and, thus, leaves the aircraft beacon light without being optically affected by the annular light splitting element 8.

The second portion of light rays 62 is refracted twice on its way through the annular light splitting element 8. In particular, the light rays are refracted once upon entering the body of the annular light splitting element 8 and are refracted a second time upon leaving the body of the annular light splitting element 8. The exit surface of the body of the annular light splitting element 8 is referred to as refractive surface 22. The refractive surface 22 is an example of a light conditioning element that affects and shapes the light intensity distribution of the light having passed the annular light splitting element 8 through the transmissive portions thereof. While the refractive surface 22 is shown in FIG. 5 to have a similar contour as the proximate side 10 of the annular light splitting element 8, the refractive surface 22 may have any kind of suitable geometry and may, thus, allow for refracting the light rays, coming from the LEDs 6, in a desired manner in different directions.

It is apparent from FIG. 5 that the four different portions of light rays 60, 62, 64, and 66 experience different optical effects in the aircraft beacon light 2 after being emitted from the LEDs 6. These different portions of light rays provide for a good basis for satisfying regulatory requirements and/or design goals of the aircraft beacon light 2. In particular, the different portions of light rays provide for various degrees of freedom, which may be used in satisfying particular required light intensity distributions in a very efficient manner.

While the four different portions of light rays 60, 62, 64, and 66 are a beneficial way of splitting up the light emitted from the plurality of LEDs 6, it is pointed out that not all of these mechanisms are necessary. For example, the proximate side 10 may not have two different parabolic light collimation sections. Also, the transmissive portions of the proximate side of the annular light splitting element may have no optical effect, i.e. the transmissive portions may be simple holes in the proximate side of the annular light splitting element 8. In this scenario, the light having passed through the annular light splitting element 8 may be conditioned via another kind of light conditioning element, such as an additional reflector or an additional lens.

Figure 6:
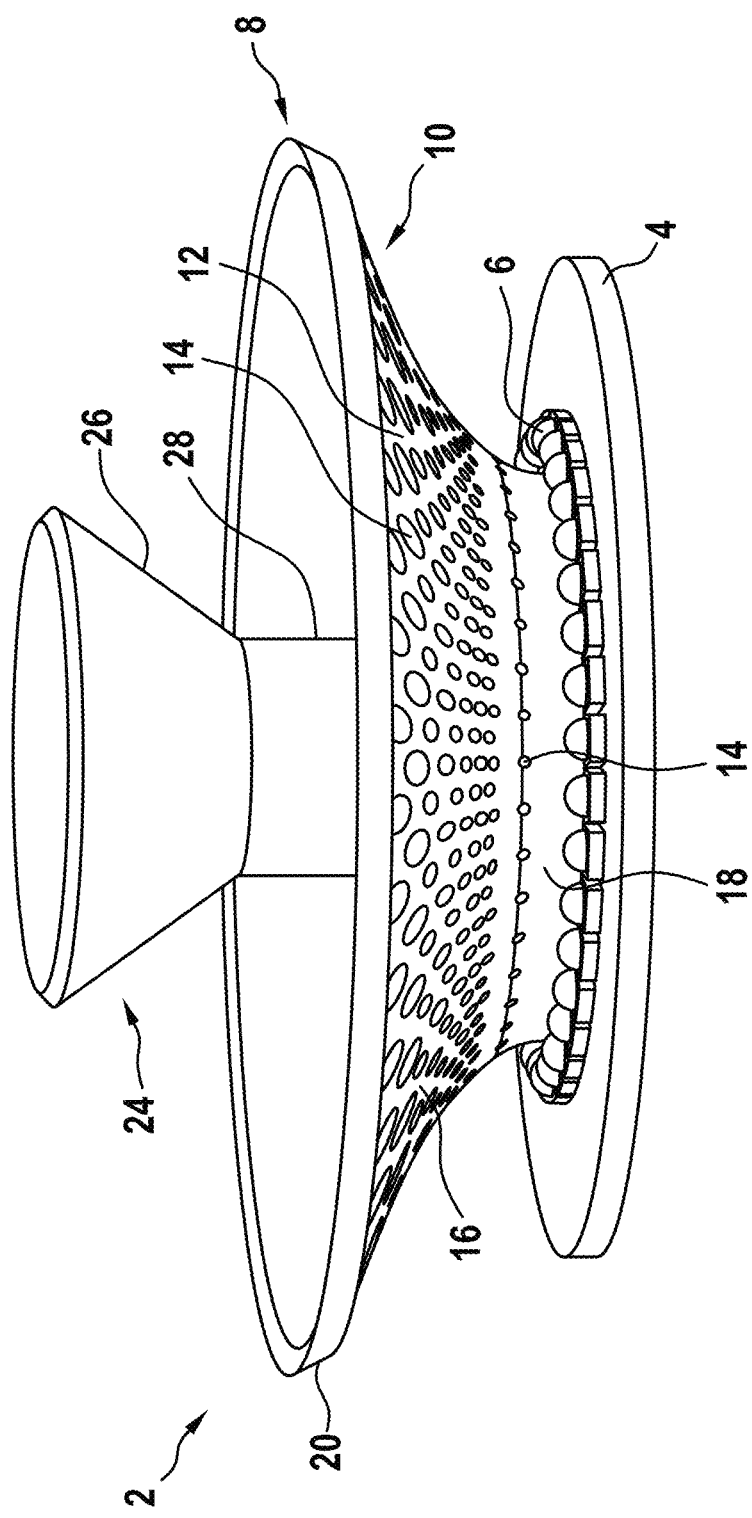
FIG. 6 shows an aircraft beacon light in accordance with another exemplary embodiment of the invention in a perspective top view.

FIG. 6 shows an aircraft beacon light 2 in accordance with another exemplary embodiment of the invention in a perspective top view. Many elements of the aircraft beacon light 2 of FIG. 6 are identical or very similar to the corresponding elements of the aircraft beacon light 2 of FIGS. 2 to 5. Reference is made to above description, which applies to the aircraft beacon light 2 of FIG. 6 in an analagous manner, unless stated otherwise.

In particular, the annular light splitting element 8 of the aircraft beacon light 2 of FIG. 6 is the same as the annular light splitting element 8 of FIGS. 2 to 5, except for the provision of additional transmissive portions 14 in the second parabolic light collimation section 18. In particular, 40 such additional transmissive portions 14 are provided in an equidistant manner around the circumference of the proximate side 10 of the annular light splitting element 8. These additional transmissive portions 14 are the transmissive portions closest to the LEDs 6.

Further, the aircraft beacon light 2 of FIG. 6 comprises an additional reflector 24, which is mounted to a support arm 28. The support arm 28 extends orthogonal from the support plate 4 through the annular light splitting element 8. The support arm 28 is attached to the central portion 42 of the support plate 4. The additional reflector 24 is also a rotationally symmetric structure and has a third parabolic light collimation section 26. With the third parabolic light collimation section 26 being further removed from the LEDs 6 than the first and second parabolic light collimation sections 16, 18, the curvature of the third parabolic light collimation section 26 is substantially smaller than the curvature of the first and second parabolic light collimation sections 16, 18. The additional reflector 24 is further removed from the support plate than the circumferential end 20 of the annular light splitting element 8. As will be described in detail with respect to FIG. 7, the additional reflector 24 is provided for conditioning the light passing through the additional transmissive portions 14 of the annular light splitting element 8. The additional reflector 24 is another example of a light conditioning element.

Figure 7:
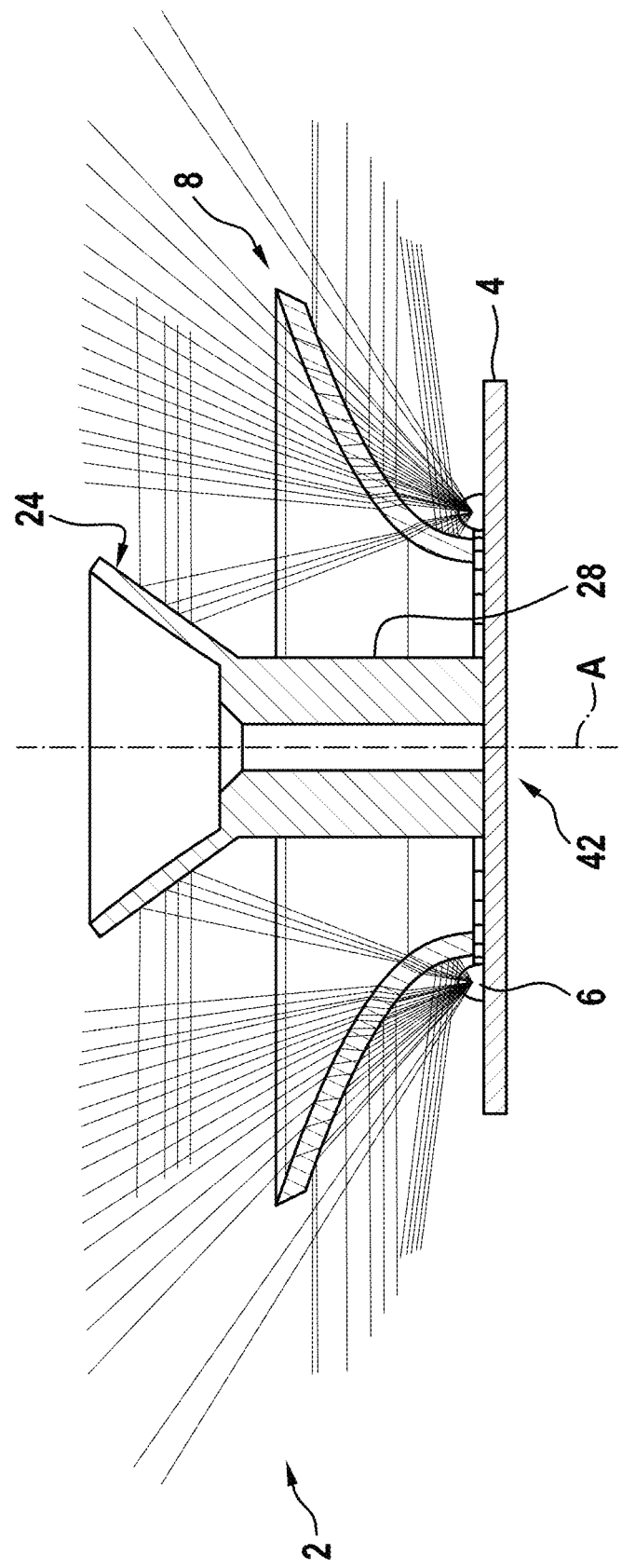
FIG. 7 shows the aircraft beacon light of FIG. 6 in a cross-sectional view and illustrates the light output via exemplary light rays.

FIG. 7 shows a cross-sectional view through the aircraft beacon light 2 of FIG. 6. In particular, FIG. 7 shows a vertical cross-sectional view through the aircraft beacon light 2, i.e. a cross-sectional view orthogonal to the support plate 4. FIG. 7 shows various light rays for illustrating the optical effect of the annular light splitting element 8 as well as the optical effect of the additional reflector 24. In order not to overcrowd FIG. 7, various of the reference numerals of FIG. 6 are omitted from the cross-sectional view of FIG. 7. It is understood that those reference numerals apply to FIG. 7 in an analogous manner.

The mounting arm 28 is attached to the central portion 42 of the support plate 4 via an according attachment screw, as is illustrated by an according bore through the center of the support arm 28. The additional reflector 24 is a hollow structure, saving weight for the aircraft beacon light 2.

The annular light splitting element 8 acts on the light from the LEDs 6 in the same manner as the annular light splitting element 8 of FIGS. 2 to 5, with the exception of passing light through additional transmissive portions, which light is then reflected by the additional reflector 24. Accordingly, reference is made to above description of the optical effect of the annular light splitting element 8, as in particular laid out with respect to FIG. 5.

The light reaching the additional reflector 24 has the following light path, as illustrated by exemplary light rays in FIG. 7. After being emitted by the LEDs 6, the light reaches the transmissive portions of the proximate side 10 of the annular light splitting element 8 that are present over the central portion 42 of the support plate 4, i.e. the transmissive portions to a lateral inside of the circular arrangement of LEDs 6. The light is refracted once at the proximate side 10 of the annular light splitting element 8 and is refracted again at the distal side 22 of the annular light splitting element 8, also referred to as the refractive surface 22 herein. From there, the light reaches the additional reflector 24 and is collimated by the additional reflector 24, in particular by the third parabolic light collimation section 26 thereof. In particular, the light is redirected in light output directions parallel to the support plate 4. While the additional reflector 24 is described to be parabolic and to collimate the incident light, the additional reflector 24 may also have different shapes and may reflect the light towards different desired angles, depending on the particular implementation of the aircraft beacon light 2.

In the exemplary embodiment of FIG. 7, the light reflected by the additional reflector 24 is used as reinforcement of the light output in the angular range between 0° and 5° in the far field. In addition, said light is used for passing obstacles that may be present around the aircraft beacon light 2 in the near field and that may block light reflected by the proximate side of the angular light splitting element 8.

Figure 8:
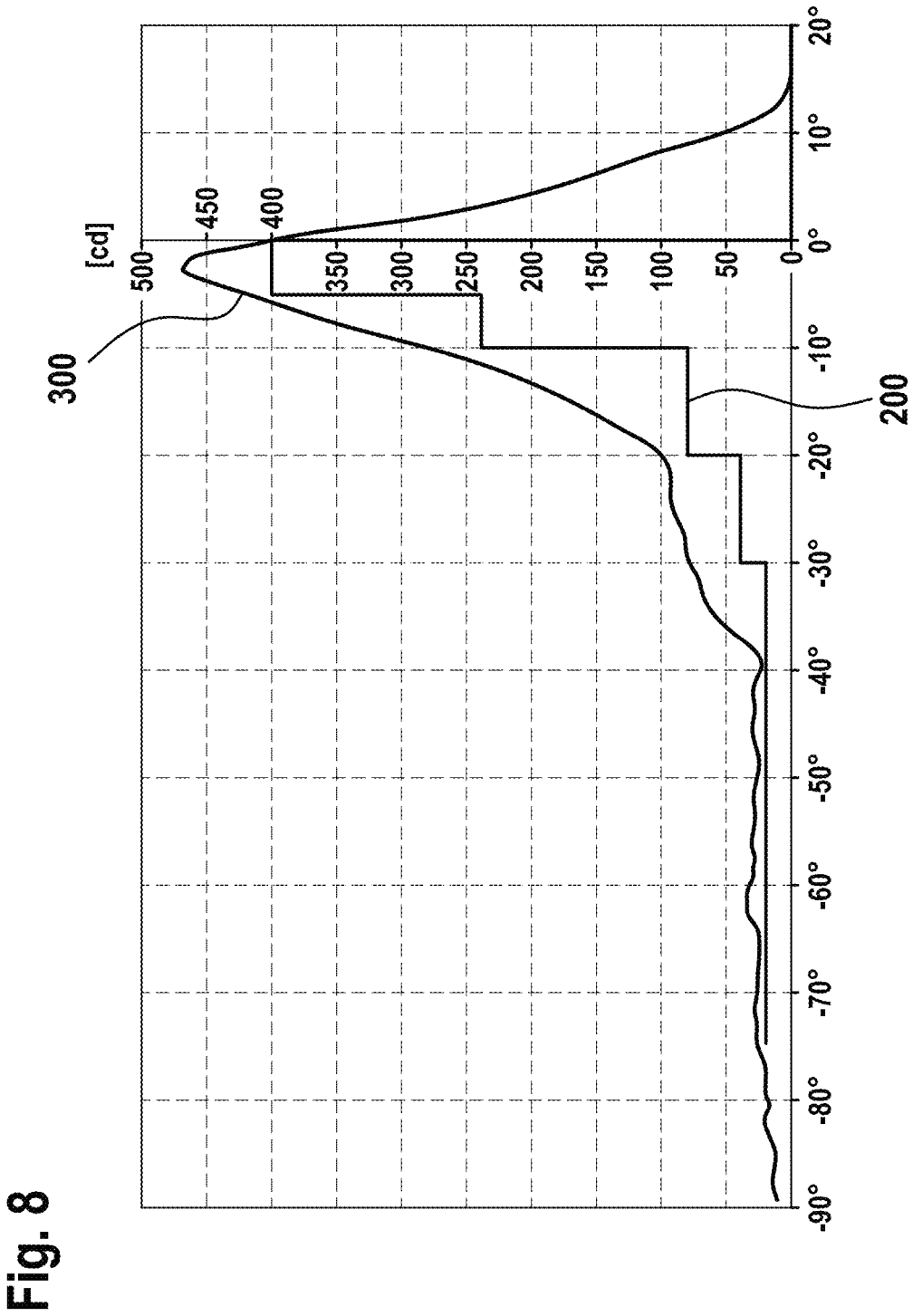
FIG. 8 shows the light intensity distribution of an aircraft beacon light in accordance with an exemplary embodiment of the invention, as compared to the requirements of the Federal Aviation Regulations.

FIG. 8 shows an exemplary output light intensity distribution 300 of an aircraft beacon light in accordance with an exemplary embodiment of the invention for a vertical cross-section therethrough. In particular, FIG. 8 shows the output light intensity distribution 300 primarily for negative angular values, indicating a use case where the aircraft beacon light is mounted to a lower portion of an aircraft fuselage. The output light intensity distribution 300 is shown with respect to the requirements of FAR section 25.1401, which are shown as a step curve 200 in FIG. 8.

The output light intensity distribution 300 of the exemplary aircraft beacon light 2 exceeds the required light intensity distribution 200 at all points. However, it exceeds the required light intensity distribution 200 by comparably small margins, indicating an efficient satisfaction of the FAR requirements. In other words, the output light intensity distribution 300 fulfils the FAR requirements in a very efficient manner. It is pointed out that the output light intensity distribution 300 may be achieved with either of the aircraft beacon lights 2 discussed above in detail.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An aircraft beacon light for emitting flashes of red light into an environment around an aircraft, comprising:
    a support plate having a central portion;
    a plurality of LEDs, arranged on the support plate around the central portion and facing away from the support plate;
    an annular light splitting element, having a proximate side arranged over and facing the plurality of LEDs, wherein the proximate side has reflective portions and transmissive portions,
    wherein the annular light splitting element is rotationally symmetric around an axis of rotation, wherein the reflective portions of the proximate side of the annular light splitting element are metallized portions of the annular light splitting element and wherein the transmissive portions of the proximate side of the annular light splitting element are non-metallized dots of the annular light splitting element, and wherein the non-metallized dots of the annular light splitting element are arranged in a regular pattern and increase in size for an increase in distance with respect to the axis of rotation; and at least one light conditioning element for redirecting light having passed through the transmissive portions of the proximate side of the annular light splitting element.

2. The aircraft beacon light according to claim 1, wherein the plurality of LEDs are arranged on the support plate in a substantially circular arrangement.

3. The aircraft beacon light according to claim 1, wherein the reflective portions of the proximate side of the annular light splitting element are shaped to reflect light from the plurality of LEDs towards light output directions parallel to the support plate.

4. The aircraft beacon light according to claim 1, wherein the proximate side of the annular light splitting element has, in cross-section, a first substantially parabolic light collimation section, with light reflected from the first substantially parabolic light collimation section in particular being collimated substantially parallel to the support plate.

5. The aircraft beacon light according to claim 4, wherein the proximate side of the annular light splitting element has, in cross-section, a second substantially parabolic light collimation section, with light reflected from the second substantially parabolic light collimation section in particular having an angle of between 5° and 15° with respect to the support plate.

6. The aircraft beacon light according to claim 5, wherein the at least one light conditioning element comprises a refractive surface and wherein the refractive surface forms part of a distal side of the annular light splitting element.

7. The aircraft beacon light according to claim 1, wherein the at least one light conditioning element comprises an additional reflector.

8. The aircraft beacon light according to claim 7, wherein the additional reflector has, in cross-section, a third substantially parabolic light collimation section.

9. The aircraft beacon light according to claim 7, further comprising:

a support arm, extending from the support plate;
wherein the additional reflector is part of or is attached to the support arm.

10. The aircraft beacon light according to claim 7, wherein at least part of the transmissive portions of the proximate side of the annular light splitting element are arranged over the central portion of the support plate and wherein the additional reflector is arranged to reflect light having passed through the transmissive portions over the central portion of the support plate.

11. The aircraft beacon light according to claim 1, wherein the annular light splitting element has a circumferential end that extends laterally outwards beyond the plurality of LEDs and wherein a light output direction from the plurality of LEDs to the circumferential end of the annular light splitting element has an angle (a) of between 20° and 50° with respect to the support plate.

12. The aircraft beacon light according to claim 1, wherein the reflective portions cover between 50% and 95% of the proximate side of the annular light splitting element.

13. An aircraft comprising:

an upper aircraft beacon light in accordance with claim 1 mounted to an upper portion of a fuselage of the aircraft, and a lower aircraft beacon light in accordance with claim 1, mounted to a lower portion of a fuselage of the aircraft.

* * * * *